United States Patent

Kienzler et al.

Patent Number: 5,539,778
Date of Patent: Jul. 23, 1996

[54] RECEPTION COMPARATOR

[75] Inventors: Rainer Kienzler, Reutlingen; Ulrich Fleischer, Pliezhausen; Berthold Elbracht, Reutlingen, all of Germany

[73] Assignee: Robert Bosch GmbH, Stuttgart, Germany

[21] Appl. No.: 119,092

[22] PCT Filed: Feb. 22, 1992

[86] PCT No.: PCT/DE92/00131

§ 371 Date: Sep. 16, 1993

§ 102(e) Date: Sep. 16, 1993

[87] PCT Pub. No.: WO92/17016

PCT Pub. Date: Oct. 1, 1992

[30] Foreign Application Priority Data

Mar. 16, 1991 [DE] Germany .................. 41 08 709.7

[51] Int. Cl.[6] .................. H04L 25/06; H04B 3/00
[52] U.S. Cl. .................. 375/317; 375/257; 327/389; 327/434
[58] Field of Search .................. 375/257, 287–289, 375/317–318; 327/434, 208, 210, 389, 427

[56] References Cited

U.S. PATENT DOCUMENTS

| 4,679,209 | 7/1987 | Hogeboom et al. | 375/287 |
| 4,847,865 | 7/1989 | Larson | 375/319 |
| 5,243,625 | 9/1993 | Verbakel et al. | 375/317 |
| 5,321,724 | 6/1994 | Long et al. | 375/257 |

FOREIGN PATENT DOCUMENTS

| 0292117 | 11/1988 | European Pat. Off. | 375/317 |
| 0212780 | 12/1984 | Japan | 375/317 |

*Primary Examiner*—Young T. Tse
*Attorney, Agent, or Firm*—Kenyon & Kenyon

[57] ABSTRACT

A receiving comparator for a data-transmission system comprising at least one control unit and data-transmission lines, in particular for at least one Controller Area Network (CAN) controller and one CAN bus system having a CAN bus (CB) is proposed, which is distinguished by the feature that the individual circuit elements are monolithically integrated. By generating a switching threshold which is independent of the operating voltage and temperature with the aid of a current source ($I_S$), one prevents the CAN bus potentials from being asymmetrically influenced. The arrangement guarantees a processing of digital signals with a high data rate, whereby the input common-mode range extends up to above the supply voltage and to below ground.

6 Claims, 2 Drawing Sheets

5,539,778

RECEPTION COMPARATOR

BACKGROUND OF THE INVENTION

The invention relates to a receiving comparator for a data-transmission system.

Receiving comparators for data-transmission systems, in particular for controller-area-network bus systems (CAN bus systems) are generally known. They are used to adapt, or rather to convert, the level of signals which are exchanged between CAN control circuits (CAN controllers) and the CAN bus, to render possible an optimal signal processing. The disadvantage of such known systems is that their space requirements are relatively high, thus resulting in a high manufacturing expenditure and, finally, a high failure quota.

SUMMARY OF THE INVENTION

The receiving comparator in accordance with the present invention has the advantage of requiring very little space. It is also distinguished by a high functional reliability. In addition, any short-circuiting of the CAN-bus lines to ground or to the voltage supply is able to be compensated particularly well. Moreover, the present invention also allows for signals having a high transmission rate to be transmitted. This is achieved by providing the circuit elements of the comparator on a single semiconductor substrate, thereby monolithically integrating the entire circuit arrangement.

A first embodiment of the receiving comparator according to the present invention comprises a signal-conditioning device having a voltage divider, which is provided with a reference-voltage source and whose potential is preferably selected so as to allow the input signals of the following comparator to lie within the supply band. This signal-conditioning device makes it possible to process signals which are being received on the CAN bus and whose potentials lie outside of the supply band of the comparator, thus whose potentials are greater than the positive supply voltage of the comparator and smaller than its negative supply voltage. A short-circuiting of at least one of the data-transmission lines to ground, inclusive of ground offset, or to the supply voltage can thus be compensated.

In addition, a further embodiment of the receiving comparator includes a comparator circuit arrangement, which has a threshold-value generating device, preferably a current source, arranged downstream from the signal-conditioning device. In the case of such a comparator circuit, it is guaranteed that the CAN bus is not brought on to load asymmetrically by the input comparator. This is particularly advantageous when numerous input comparators are linked to the data bus.

Furthermore, one further embodiment of the receiving comparator includes a signal-amplifier stage, which is preferably designed with ECL technology, arranged downstream from the comparator circuit. Such an amplifier stage guarantees a very small signal delay, so that digital signals having a high transmission rate are also able to be transmitted, the input common-mode range extending thereby up to above the supply voltage and to below ground.

Finally, another embodiment of the receiving comparator includes an output stage, preferably comprising MOS-transistors and npn-transistors, arranged downstream from the signal-amplifier stage. Through the selection of such circuit elements, it is guaranteed that this part of the receiving comparator also attains a high switching rate, whereby a large output voltage range is ensured at the same time.

In accordance with a still further embodiment of the present invention, the individual circuit elements are accommodated on one and the same substrate. Synchronous responses to temperature changes are guaranteed thereby, for example, in the case of the resistors of the voltage divider and in the input comparator, so that an optimal temperature compensation is guaranteed.

DETAILED DESCRIPTION OF THE DRAWINGS

The input comparator according to the invention can be used desired for any desired data-transmission device. It will be clarified in the following on the basis of a CAN bus 10.

Figure 1:
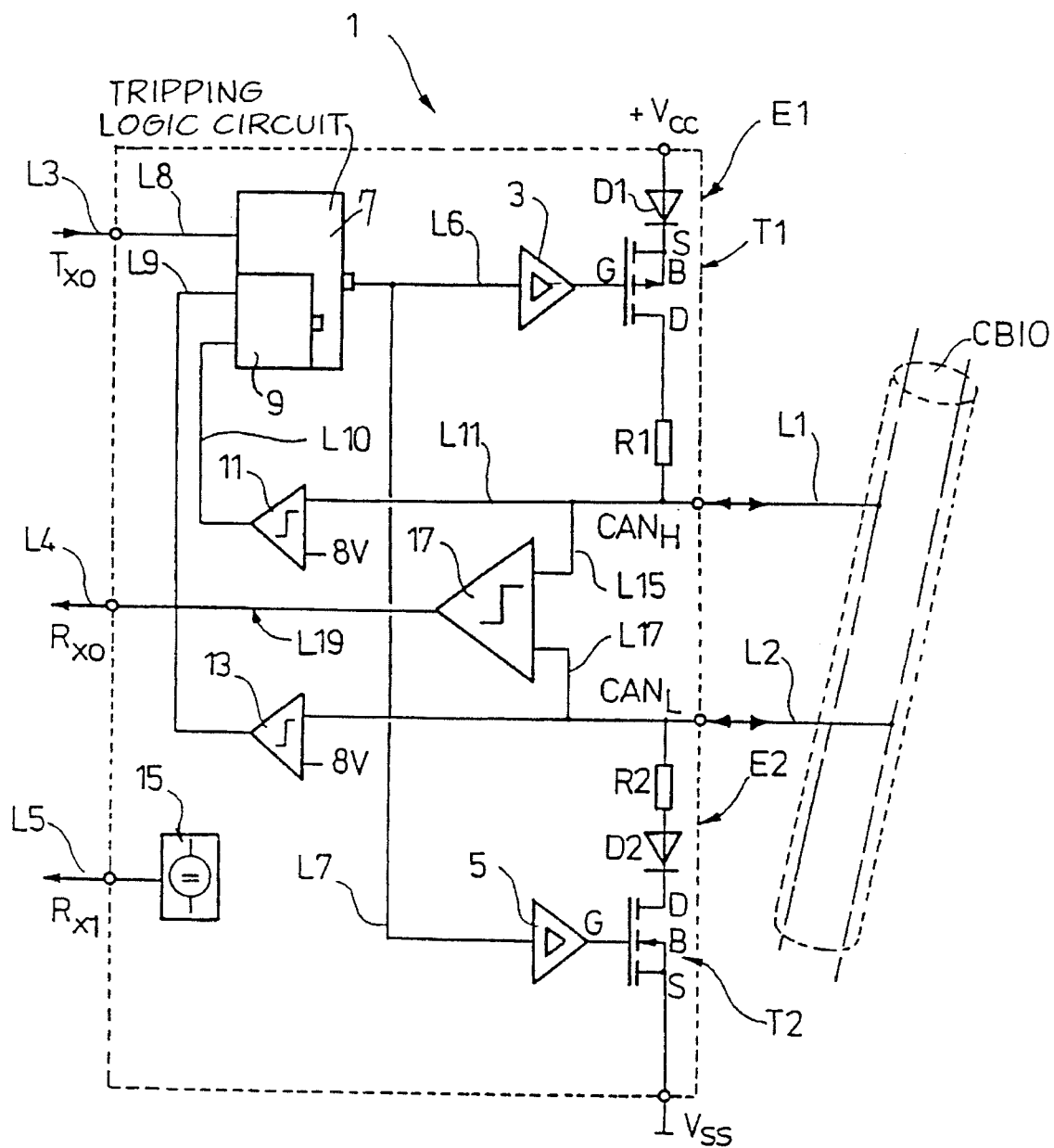
FIG. 1 shows a block diagram of a CAN driver with an input comparator and with a sketched CAN bus.

FIG. 1 depicts a CAN driver 1, whose circuit elements are surrounded by a dotted line. A CAN bus CB, which is designed here as a two-wire bus, is connected to the CAN driver 1 via suitable lines L1 and L2. Via the lines L1 and L2, signals are transmitted, on the one hand, from the driver to the bus and, on the other hand, in the reverse direction. These lines are linked to two connecting points $CAN_H$ and $CAN_L$.

The CAN driver 1 in accordance with FIG. 1 has other connections, namely a connection $+V_{cc}$, which a positive supply voltage can be connected up to, as well as a terminal $V_{ss}$, which, for example, can be connected to ground.

Signals from a control circuit not shown here, or rather from a CAN controller are applied via a line L3 to a terminal characterized by $T_{x0}$.

Signals being applied to a terminal $R_{x0}$ are routed via a line L4 and signals being applied to a terminal $R_{x1}$ are routed via a line L5 to the CAN controller, which is not shown here.

A first switching stage E1, which is allocated to the terminal $CAN_H$, is connected up to the connecting terminal $+V_{cc}$. The first switching stage E1 comprises a first diode $D_1$, whose anode contacts the terminal $+V_{cc}$. It is electroconductively connected to an MOS transistor T1, which is designed here, for example, as an enhancement MOS FET. The cathode of $D_1$ is connected to the source connection S and to the bulk connection B of the transistor. The drain connection D of the transistor leads via a resistor R1 to the terminal $CAN_H$. The transistor T1 (not shown here) is designed as a p-channel FET.

The gate connection G of the transistor T1 is connected to the output of a driver circuit 3 that is only sketched here.

A second switching stage E2 is situated between the terminal $CAN_L$ and the terminal $V_{ss}$. In this case, a resistor R2 is linked directly to the terminal $CAN_L$, which is connected on the other side to the anode of a diode $D_2$. Its cathode is connected to the drain connection D of a second transistor T2, which is likewise designed as an enhancement MOS FET. This transistor is preferably designed as an n-channel MOS FET. Its bulk connection B and source connection S are interconnected and are connected to the terminal $V_{ss}$. The gate connection G of the second transistor T2 is connected, in turn, to the output of a driver circuit 5, which is only sketched in the drawing. The two driver circuits 3 and 5 of the switching stages E1 and E2 are triggered via lines L6 and L7 by a tripping-logic circuit 7, which serves to protect the switching-stage transistors from damage in case of a short-circuit or a polarity reversal. This is a circuit of prior art, so that one will dispense with describing it here.

The signals from the CAN controller are applied via line L3 and via terminal $T_{x0}$ to the input line L8 of the tripping-logic circuit 7. In addition, this circuit has a circuit 9, whose inputs L9 and L10 are connected via comparator circuits 11 and 13 to the terminals $CAN_H$ and $CAN_L$.

The signals from the CAN bus CB being applied to the terminal $CAN_H$ are applied via a line L11 to a first input of the comparator 11, at whose second input is applied a fixed reference voltage of, for example, 8 V.

Signals from the CAN bus CB being applied via a line L2 to the terminal $CAN_L$ are applied to a first input of the comparator 13, at whose second input is applied, for example, a reference voltage of 8 V.

The CAN driver 1 also comprises a voltage divider 15, by means of which a reference voltage is generated at the terminal $R_{x1}$ for other circuit elements of the driver module.

The CAN driver 1 has an input comparator 17, at whose first input are applied signals from the terminal $CAN_H$ via a line L15, and at whose second input are applied signals from the terminal $CAN_L$ via a line L17. This means, therefore, that the signals being received from the CAN bus are applied to the input side of the receiving comparator 17.

The output of the receiving comparator 17 is connected via a line L19 to the terminal $R_{x0}$. The signals being applied to this terminal are routed via the line L4 to the CAN controller.

Thus, FIG. 1 depicts a cut-away portion of a CAN bus system, whose CAN bus CB is designed as a two-wire bus, as used, for example, in motor vehicles. The signals existing on the CAN bus are applied via lines L1 and L2 to the terminals $CAN_H$ and $CAN_L$ Of the CAN driver 1, processed by the receiving comparator 17, and routed via terminal $R_{x0}$ and via line L4 to the CAN controller. Conversely, signals from the CAN controller can be applied via the terminal $T_{x0}$ and via the tripping logic 7 to the switching stages E1 and E2 and, thus, attain terminals $CAN_H$ and $CAN_L$. These types of signals that are emitted by the CAN controller can then be supplied via lines L1 and L2 to the CAN bus.

Figure 2:
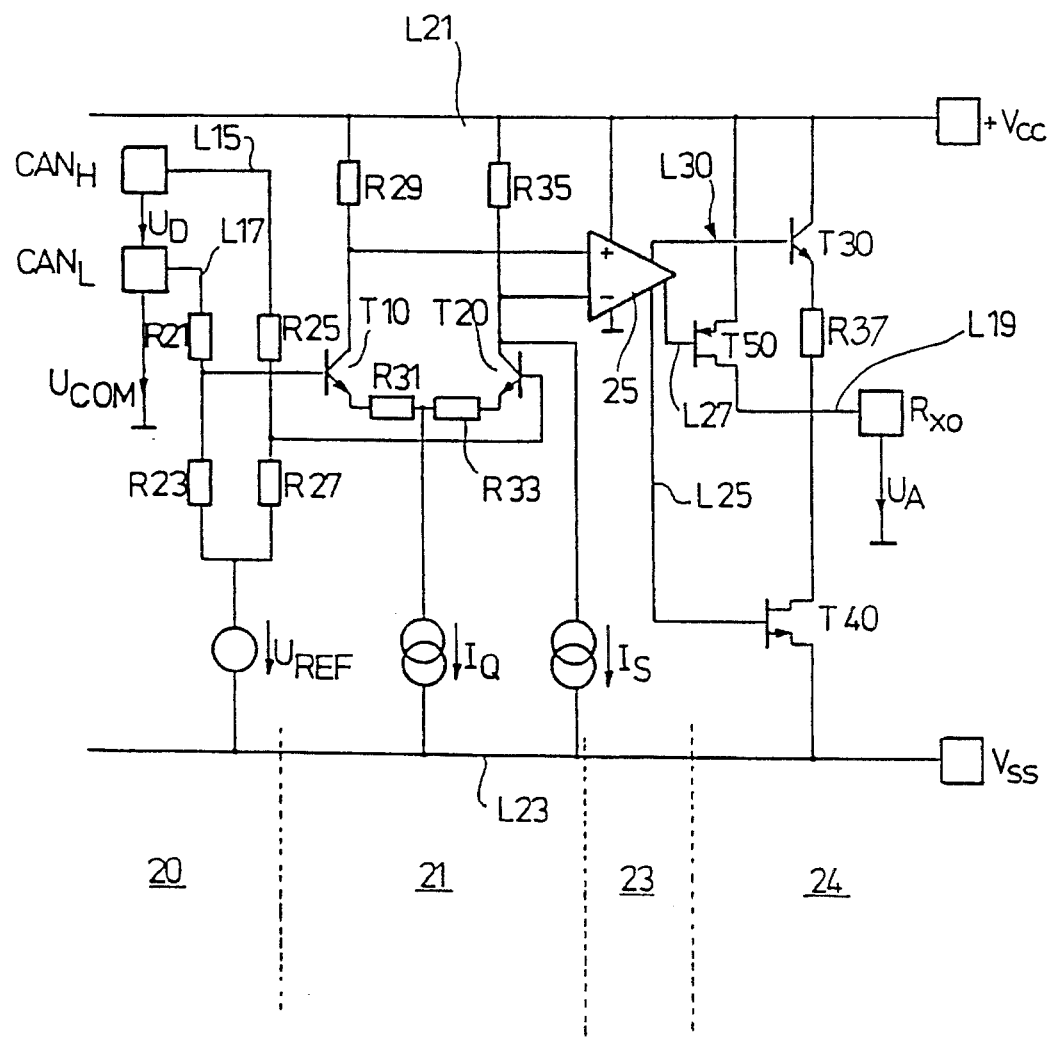
FIG. 2 shows a basic circuit arrangement of the input comparator that was merely sketched in FIG. 1.

The structure of the receiving comparator 17 that is merely sketched in FIG. 1 is revealed in the circuit diagram illustrated in FIG. 2. Parts which conform in FIGS. 1 and 2 are provided with the same reference symbols, so that one can dispense with describing them in detail.

It is apparent from FIG. 2 that the receiving comparator 17 is connected via a line L21 to the terminal $+V_{cc}$ of the CAN driver 1 and, via a line L23, to the terminal $V_{ss}$ of the CAN driver. In FIG. 2, the terminals $CAN_H$ and $CAN_L$ of the CAN driver 1 are also drawn in; as are the two lines L15 and L17, via which signals from the CAN bus CB are fed to the receiving comparator 17. The differential voltage $U_D$, which is processed further by the receiving comparator, is applied between the terminals $CAN_H$ and $CAN_L$. The voltage $U_{COM}$, which is used to define the input common-mode range of the receiving comparator 17, is applied between ground and the terminal $CAN_L$. This voltage can be a negative voltage or it can be greater than the supply voltage across the terminal $+V_{cc}$.

Dotted lines in FIG. 2 indicate that the receiving comparator 17 consists of four cascaded stages, namely of a signal-conditioning device designed as an input-dividing stage 20, a comparator circuit 21 designed as an input-current switch, a signal-amplifier stage 23 and, finally, of an output stage 24.

The input-dividing stage has a voltage divider, which interacts with a reference-voltage source $U_{REF}$. A first series connection consisting of two resistors R21 and R23 is situated between the terminal $CAN_L$ and the first side of the reference-voltage source $U_{REF}$, which is linked with its other side to line L23. A second series connection consisting of resistors R25 and R27 is situated between the terminal $CAN_H$ and the first side of the reference-voltage source $U_{REF}$.

The connection point between the resistors R21 and R23 is connected to the base of a transistor T10; the junction point of resistors R25 and R27 is connected to the base of a transistor T20. A resistor R29 is situated between line L21 and the collector of the transistor T10. A resistor R31 is situated between the emitter and the first connection of a current source $I_Q$, which serves as the cross-current adjustment of the comparator and whose second connection is linked to line L23. This resistor is also connected to a resistor R33, which communicates electroconductively with the emitter of the transistor T20. Its collector is connected to a resistor R35, which is linked on the other side to line L21. The comparator, or rather the input-current switch 21 also has a current source $I_S$, which is connected, on the one hand, to line L23 and, on the other hand, to the collector of the transistor T20.

The transistors T10 and T20 of the input-current switch 21 are designed as npn transistors.

This second stage of the input comparator 17 is followed by the third stage, i.e., the signal-amplifier stage 23, which preferably has a comparator 25 realized in ECL technology. Its supply voltage follows via the clamp $+V_{cc}$. The collector of the transistor T10 is connected up to its non-inverting input, and the collector of the transistor T20 of the input-current switch 21 is connected up to its inverting input.

The fourth stage of the receiving comparator 17, the output stage 24, has a series connection situated between line L21 and L23 consisting of a transistor T30, a resistor R37, and of a transistor T40, the collector of the npn transistor T30 being connected to line 21, and its emitter to resistor R37. The other connection of this resistor is connected to the terminal $R_{x0}$. This second connection of the resistor R37 is connected via the drain and source of the n-channel-FET transistor T40 to line L23.

Situated between line L21 and terminal $R_{x0}$, is the drain-source section of a second FET transistor T50, which is triggered by the signal-amplifier stage 23 via line L27 in the same way as is transistor T40 via a line L25. The transistor T30 is likewise triggered by the signal-amplifier stage 23 via another line L30.

The individual circuit elements of the receiving comparator 17 are all accommodated on one single semiconductor substrate. The receiving comparator itself is accommodated on one and the same semiconductor substrate, preferably together with the remaining circuit elements of the CAN driver 1 (FIG. 1).

The signals from the CAN bus CB being applied to the input terminals of the receiving comparator 17 $CAN_H$ and $CAN_L$ can be adjusted for further processing by means of the signal-conditioning device designed as an input-dividing stage 20 and through the appropriate selection of the potential $U_{REF}$. The input-dividing stage thereby adapts the common-mode voltage range existing above, or rather below the supply voltages $+V_{CC}$, $V_{SS}$ to the input-current switch 21.

Because the resistors R21, R23, R25 and R27 are conceived in floating pans, it can be ensured that the input signals of the transistors T10 and T20 of the input comparator 21 designed as npn transistors lie within the supply band. To obtain a large input common-mode range, $U_{COM}$ can be greater than the voltage existing across the terminal $+V_{cc}$ and smaller than the potential existing across the terminal $V_{ss}$.

A switching threshold, which is independent of the temperature and the operating voltage across terminal $+V_{cc}$, is generated by the current source $I_S$ at the output of the second stage.

By means of the switching threshold that is adjusted with the help of the current source Is, it is achieved that the potentials existing across the terminals $CAN_H$ and $CAN_L$, thus the potentials of the CAN bus CB, are not influenced asymmetrically. This is particularly important when numerous CAN drivers are connected up to one and the same CAN bus.

By means of the emitter-coupled comparator 25 of the signal-amplifier stage 23, a high switching rate is achieved for triggering the final stage, so that the receiving comparator 17 can also process digital signals having a higher data rate. A high switching rate is also achieved in the series-connected stage 21 by means of the npn transistors T10 and T20. As a result of the described triggering of the final output stage 24 and its design, a short delay time is achieved in dependence upon the load capacitances, so that overall, therefore, a high switching rate is ensured for the receiving comparator 17. At the same time, a high output voltage range is guaranteed for $U_A$ at the terminal $R_{xo}$, which is connected via the line L19 to the output of the receiving comparator, so that the signals can be easily processed further.

It is established overall, therefore, that with the aid of the receiving comparator 17, a CAN driver 1 can be realized, which guarantees a signal matching between the CAN-bus CB, designed here as a two-wire line, and the CAN controller of the CAN bus system.

The short delay times are based in particular on the current switch technology described here. The receiving comparator described here guarantees a trouble-free operation even when a short-circuiting to ground occurs on the CAN bus, and even when a ground offset exists, or when there is a short-circuiting to the supply voltage.

Because of the fact that the receiving comparator 17 is monolithically designed and is preferably accommodated on a single substrate, together with the entire CAN driver circuit, an extremely short signal delay results for floating and non-floating bus systems. A high input-voltage common-mode range is also guaranteed above the supply voltage and below the frame potential. The integrated module can be realized very easily and, thus, inexpensively. Finally, the monolithic integration makes it possible to achieve a highly fail-safe operation and excellent temperature compensation.

What is claimed is:

1. A receiving comparator for a data-transmission system having at least one control unit and at least one data-transmission line, the receiving comparator comprising:

a signal conditioning device having an input for connection to the at least one data-transmission line, the signal conditioning device including an input divider for adjusting input potentials from the at least one data-transmission line;

a comparator circuit, coupled to the signal conditioning device and having a threshold-value generating device, the input divider including a reference-voltage source whose potential is selected to provide input signals to the comparator circuit which lie within a supply band;

a signal-amplifier stage coupled to the comparator circuit; and an output stage coupled to the signal-amplifier stage;

wherein the signal conditioning device, comparator circuit, signal amplifier stage, and output stage are monolithically integrated.

2. The receiving comparator according to claim 1 wherein the input divider further includes at least one resistor coupled as a floating pan.

3. The receiving comparator according to claim 2, wherein the threshold-value generating device is a current source.

4. The receiving comparator according to claim 3 wherein the comparator circuit includes at least two reversed-feedback npn transistors.

5. The receiving comparator according to claim 4, wherein the output stage includes at least two MOS-transistors and at least one npn-transistor.

6. The receiving comparator according to claim 5, wherein the receiving comparator is part of a driver circuit which includes one transmitter output stage and preferably one tripping-logic circuit.

* * * * *

UNITED STATES PATENT AND TRADEMARK OFFICE
CERTIFICATE OF CORRECTION

PATENT No. : 5,539,778

DATED : July 23, 1996

INVENTOR(S): Rainer KIENZLER et al.

It is certified that error appears in the above-identified patent and that said Letters Patent is hereby corrected as shown below:

Column 2, line 19, after "The" (first occurrence) insert --present--;

line 20, delete "desired" (first occurrence); and lines 48 and 49, after "transistor" insert -- T1--.

Column 5, line 13, "Is" should be --$I_s$--.

Signed and Sealed this

Seventeenth Day of December, 1996

Attest:

BRUCE LEHMAN

Attesting Officer

Commissioner of Patents and Trademarks